US009833094B2

(12) United States Patent
Ricker

(10) Patent No.: US 9,833,094 B2
(45) Date of Patent: Dec. 5, 2017

(54) PET BOOT JACK

(71) Applicant: Joshua J. Ricker, Toronto (CA)

(72) Inventor: Joshua J. Ricker, Toronto (CA)

(*) Notice: Subject to any disclaimer, the term of this patent is extended or adjusted under 35 U.S.C. 154(b) by 289 days.

(21) Appl. No.: 14/771,647

(22) PCT Filed: Feb. 28, 2014

(86) PCT No.: PCT/CA2014/050148
§ 371 (c)(1),
(2) Date: Aug. 31, 2015

(87) PCT Pub. No.: WO2014/134721
PCT Pub. Date: Sep. 12, 2014

(65) Prior Publication Data
US 2016/0000041 A1 Jan. 7, 2016

Related U.S. Application Data

(60) Provisional application No. 61/771,833, filed on Mar. 2, 2013.

(51) Int. Cl.
A47G 25/80 (2006.01)
A01K 13/00 (2006.01)

(52) U.S. Cl.
CPC ............ A47G 25/80 (2013.01); A01K 13/007 (2013.01)

(58) Field of Classification Search
CPC ....... A47G 25/80; A47G 25/90; A01K 13/007
USPC ......... 12/108, 109, 110, 114.2, 114.6, 114.8, 12/115.6, 103; 81/302; 223/113, 114, 223/112, 116
See application file for complete search history.

(56) References Cited

U.S. PATENT DOCUMENTS

| 392,384 | A | * | 11/1888 | Wellman | A43D 5/00 12/103 |
| 1,468,709 | A | | 9/1923 | Grandeur et al. | |
| 4,966,316 | A | * | 10/1990 | George | A47G 25/82 135/66 |
| 5,065,917 | A | * | 11/1991 | Diehm | A47G 25/80 223/111 |
| 5,249,720 | A | * | 10/1993 | White | A47G 25/905 223/112 |
| 5,513,783 | A | * | 5/1996 | White | A47G 25/905 223/111 |
| 6,641,187 | B2 | | 11/2003 | Hsu | |
| 6,761,292 | B1 | * | 7/2004 | Newman | A47G 25/80 223/111 |

(Continued)

OTHER PUBLICATIONS

International Search Report for corresponding PCT/CA2014/050148 dated May 9, 2014; Completed on Apr. 8, 2014 by Simon Webster.

Primary Examiner — Monica Williams
(74) Attorney, Agent, or Firm — Tarolli, Sundheim, Covell & Tummino LLP

(57) ABSTRACT

A device and method for securing an animal boot to an animal's foot is taught. The device includes a pair of handles, a securing means and a pair of jaws that are pivotally attached to the pair of handles by the securing means. When the pair of jaws are in a closed position, an open end of the animal boot is attached around the sides of the pair of jaws. Squeezing the pair of handles towards each other causes the pair of jaws to extend away from each other to an open position and also causes the pair of jaws to expand the open end of the animal boot.

7 Claims, 5 Drawing Sheets

(56) References Cited

U.S. PATENT DOCUMENTS

| | | | |
|---|---|---|---|
| 7,395,951 B2* | 7/2008 | Clayman | A47G 25/905 223/111 |
| D585,629 S * | 2/2009 | Wang | D2/641 |
| D586,079 S * | 2/2009 | Ellingson | D2/641 |
| 8,360,012 B2 | 1/2013 | Friedland | |
| 9,681,767 B1* | 6/2017 | Barker | A47G 25/905 |
| 2004/0060950 A1* | 4/2004 | Goff | A47G 25/905 223/112 |

* cited by examiner

PET BOOT JACK

RELATED APPLICATIONS

The present invention is a U.S. National Stage under 35 USC 371 patent application, claiming priority to Serial No. PCT/CA2014/050148, filed on 28 Feb. 2014; which claims priority from U.S. Provisional No. 61/771,833, filed 2 Mar. 2013, the entirety of both of which are incorporated herein by reference.

FIELD OF THE INVENTION

The present invention relates to paw protection for pets including canines, and more particularly to a device for attaching pet socks or boots to a pet's foot.

BACKGROUND OF THE INVENTION

Some pet owners, particularly dog owners, utilize dog boots or socks as a way of protecting a dog's paws from external elements, such as heat, cold, chemicals, harmful surfaces etc. The owners attach these dog boots or socks onto the dog's foot in order to protect the paws.

For example, Pawz® (U.S. Pat. No. 8,360,012) is a brand of rubber dog boots. These dog boots may be made of a flexible and elastic material having a closed bottom end and an open top end for receiving a dog's foot. The open top end is typically narrower than the closed bottom end.

Pawz® boots and other similar products typically require two hands to prepare the boot to be able to receive the dog's foot. While two hands hold the boot open, one of the two hands must also direct the dog's foot through the opening, and completely into the boot. Given that dogs often do not like this process, it is difficult and cumbersome to get the dog boots onto a dog's foot. An improved method of attaching dog boots to a dog's paws is required.

SUMMARY OF THE INVENTION

The present application provides a device and method for attaching pet boots to an animal's paw or foot. The pet boot jack ("PBJ") device makes it easier to attach the pet boot to the pet's paw as only one hand is required to use the PBJ device.

DETAILED DESCRIPTION OF EXAMPLE EMBODIMENTS

In the example embodiments, reference is made to a dog boot and using the PBJ to attach the dog boot to a dog's paw. However, the device and method of the present application may be applied to the paw or foot of any animal or pet, such as a cat, rabbit, etc.

The components of the PBJ device can vary, but in an example embodiment the device comprises two parts representing the two halves of the device. FIGS. 1A, 1B, 1C, 4A, 4B, 5A illustrate the PBJ device 100 in a closed configuration or position and FIGS. 2A, 2B and 3 illustrate the PBJ device 100 in an open configuration or position.

Figures 1A, 1B, 1C:
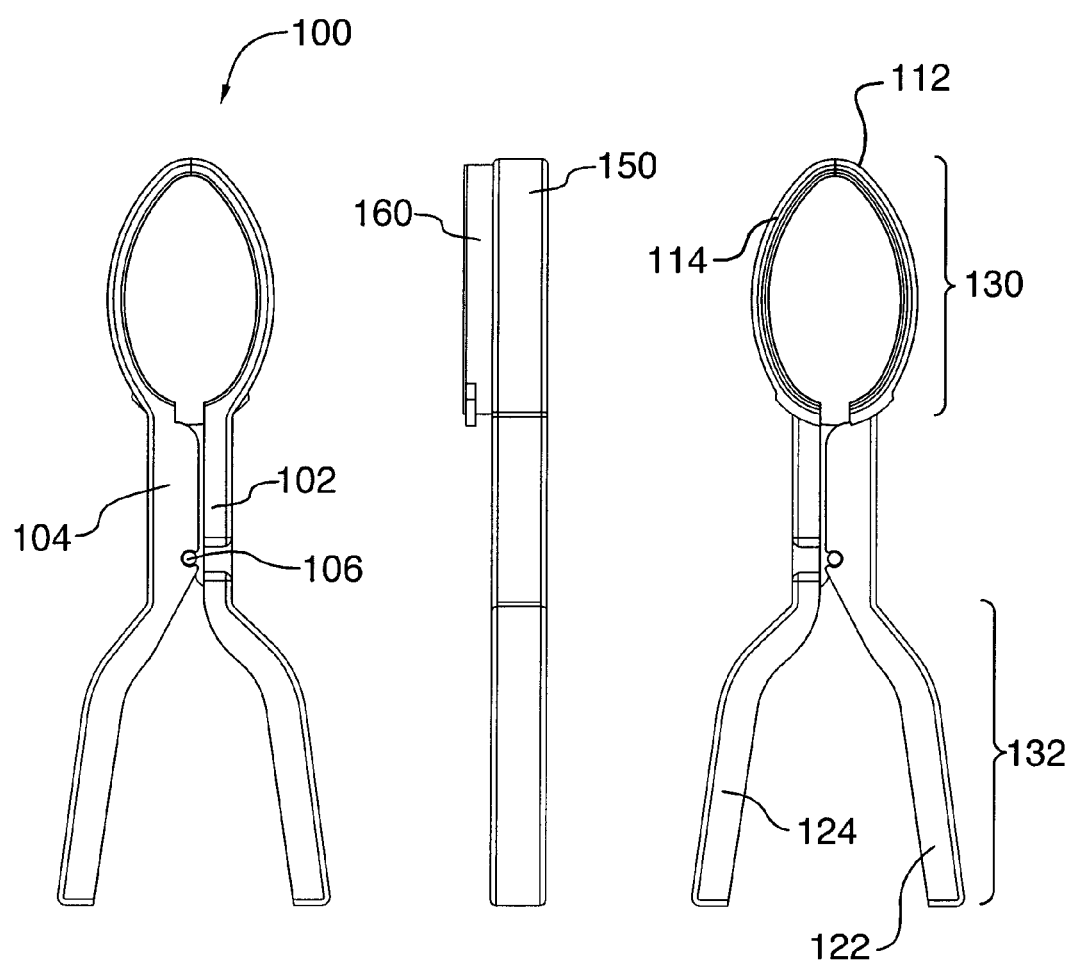
FIG. 1A illustrates a top plan view of the PBJ device in a closed configuration, according to an example embodiment of the present application.
FIG. 1B illustrates a side plan view of the PBJ device in a closed configuration, according to an example embodiment of the present application.
FIG. 1C illustrates a bottom plan view of the PBJ device in a closed configuration, according to an example embodiment of the present application.
Figures 2A, 2B:
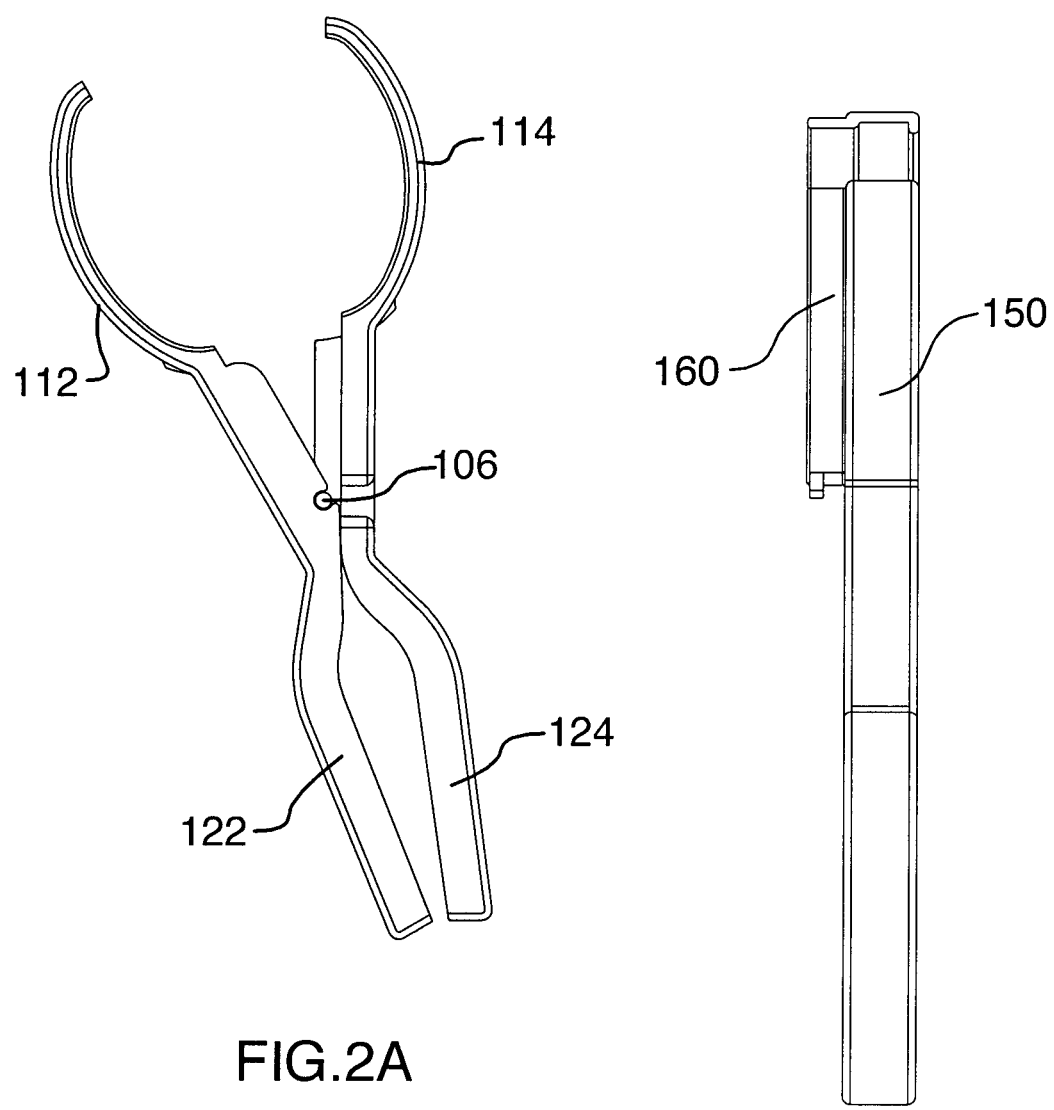
FIG. 2A illustrates a top plan view of the PBJ device in an open configuration, according to an example embodiment of the present application.
FIG. 2B illustrates a side plan view of the PBJ device in an open configuration, according to an example embodiment of the present application.
Figure 3:
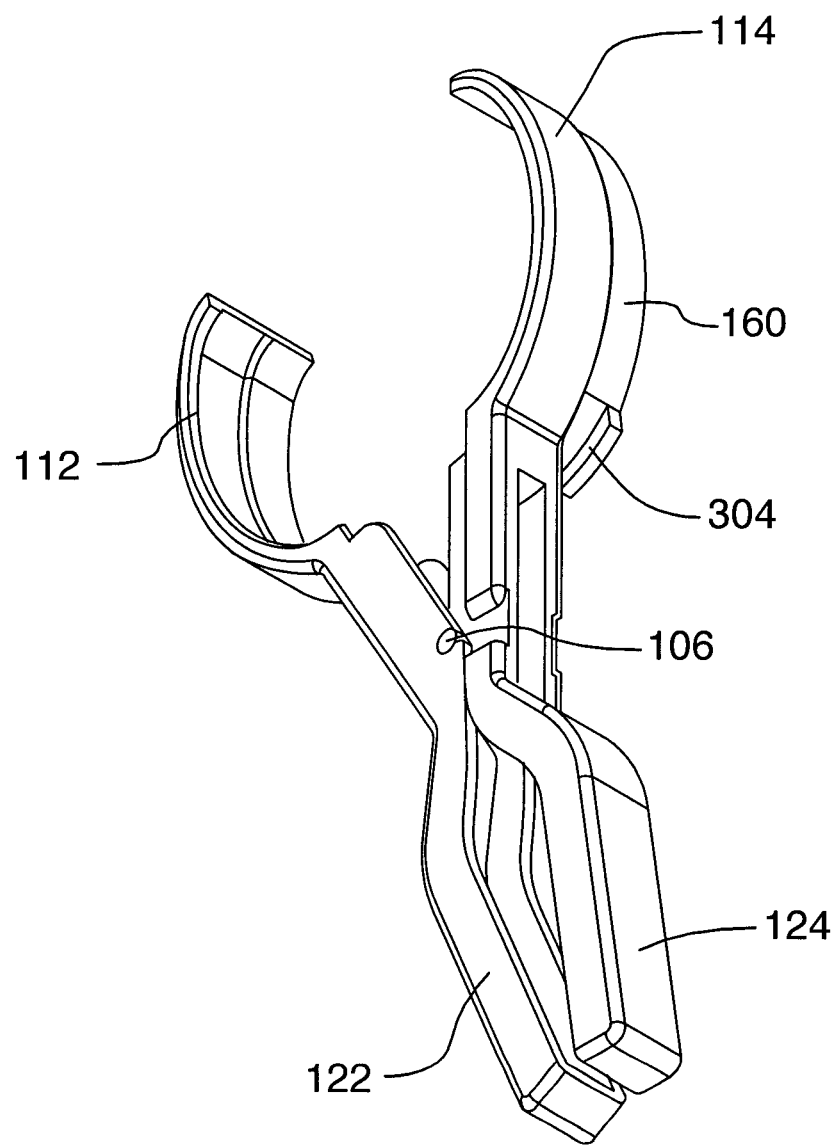
FIG. 3 shows a perspective view of the PBJ device in an open configuration, according to an example embodiment of the present application.
Figures 4A, 4B:
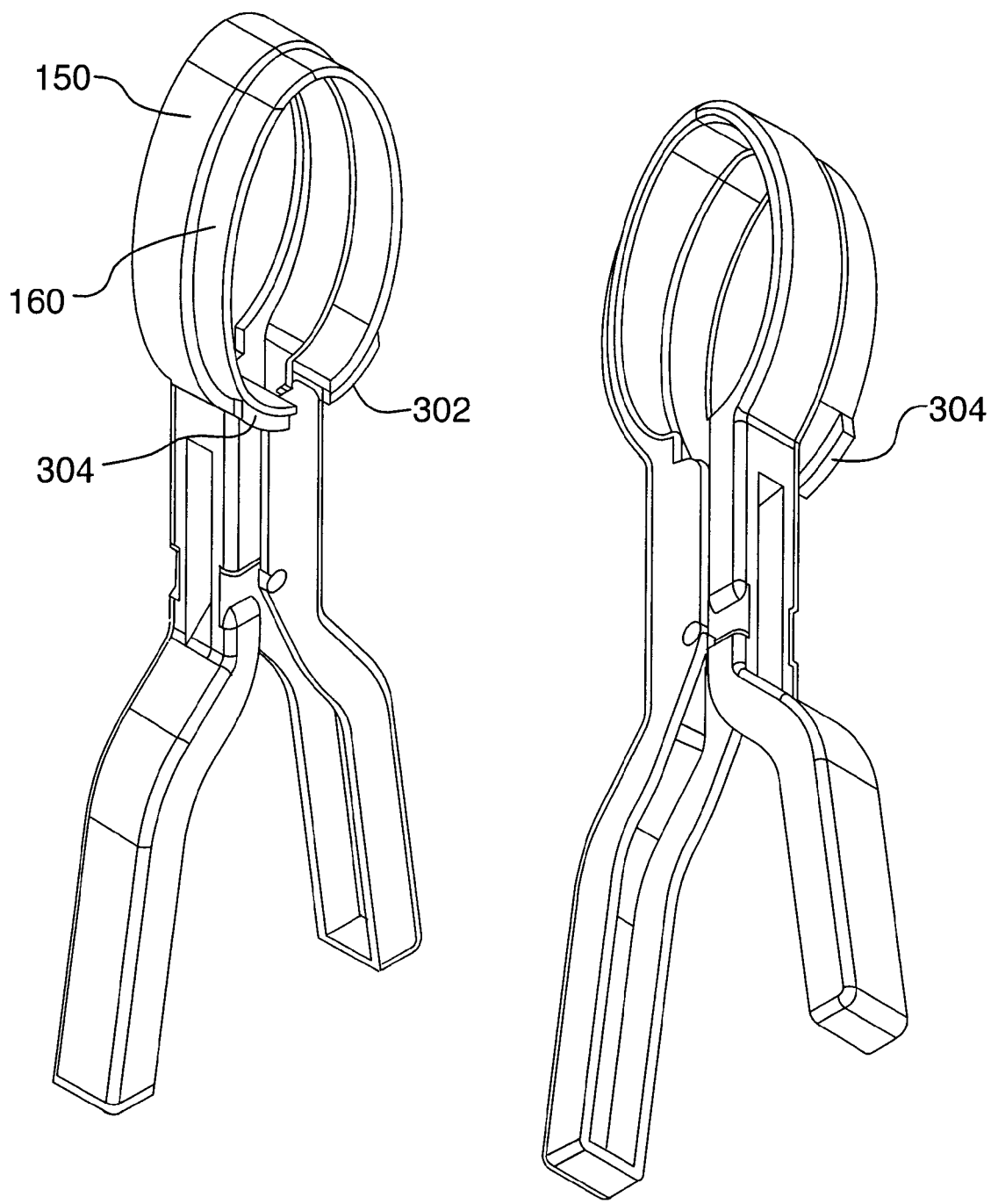
FIGS. 4A and 4B show a perspective view of the PBJ device in a closed configuration, according to an example embodiment of the present application.

As illustrated in FIGS. 1A, 1C, and 2A the PBJ 100 comprises two opposing halves 102, 104 that are pivotally attached at a securing means 106. The securing means 106 may connect the two halves 102, 104 at a single point using a screw or other type of fastener, allowing the two halves to pivot freely. The two halves 102, 104 when combined have a pair of jaws 112, 114 at one end 130 and a pair of handles 122, 124 at a second end 132.

As shown in one embodiment of FIGS. 1A and 1C, each jaw 112, 114 is curved towards each other. The size and shape of the pair of jaws 112, 114 in the closed position generally corresponds to the size and shape of the opening of a dog boot. The pair of the jaws 112, 114 may be constructed in different sizes and shapes (for example, larger or smaller) to accommodate different boot sizes for different dog breeds. For example, in one embodiment for a small sized dog foot, the length of the pair of jaws 112, 114 is approximately 1 inches, the width is approximately 0.7 inches, and the depth of the jaws 112, 114 is ¹⁄₁₆ inches. In another embodiment for a medium sized dog foot, the length of the pair of jaws 112, 114 is approximately 2 inches, the width is approximately 1⅜ inches, and the depth of the jaws 112, 114 is ⅛ inches. In a further embodiment for a large sized dog foot, the length of the pair of jaws 112, 114 is approximately 3 inches, the width is approximately 2 inches, and the depth of the jaws 112, 114 is ⅛ inches.

Figure 5A:
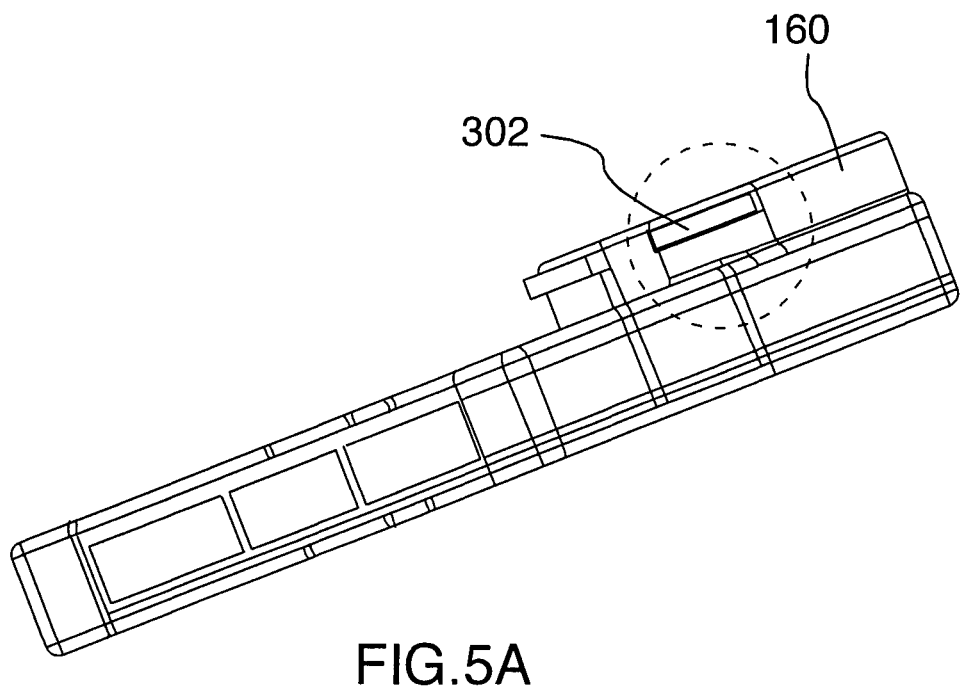
FIG. 5A illustrates a side plan view of the PBJ device in a closed configuration, according to an example embodiment of the present application.
Figure 5B:
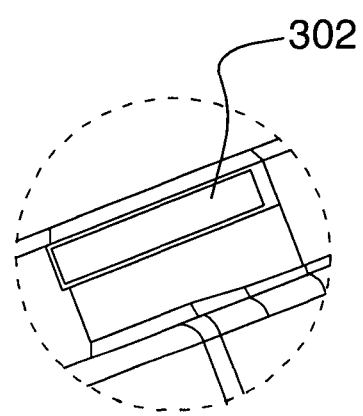
FIG. 5B illustrates a portion view of the PBJ device shown in FIG. 5A, detailing notches on a pair of jaws of the PBJ device, according to an example embodiment of the present application.

As seen in FIGS. 1B, 2B, 4A and 4B, the jaws 112, 114 have a top section 150 and a bottom section 160. The bottom section 160 is of a reduced size compared to the top section 150. For example, the side edge of the bottom section 160 in some embodiments is recessed from the side edge of the top section 150. The bottom section 160 may be referred to as a seat, and functions to receive the opening of a dog boot such that the sides of the dog boot surround the seat 160. As shown in FIGS. 5A and 5B, the width of the side of the bottom section 160 is of a sufficient size to receive a portion of the top sides of the dog boot. In one example embodiment, the side width of the bottom section is approximately ⅜ inches.

In some embodiments, as shown in FIGS. 4A, 4B, 5A and 5B the bottom section 160 of the jaws 112, 114 may include one or more notches or protrusions 302, 304 that extend outwardly from the bottom section 160. The protrusions 302, 304 secure the opening and sides of the dog boot to the bottom section 160 of the jaws 112, 114, to prevent the dog boot from slipping off the jaws 112, 114. The protrusions 302, 304 vary in size and shape depending on the size of the PBJ device 100. In an example embodiment, the length and width of the protrusions 302, 304 is less than the length and width of the sides of the bottom portion 160. As well, the protrusions 302, 304 may be positioned anywhere along the bottom section 160. In the example embodiments shown in FIGS. 4A and 4B, the protrusions 302, 304 are located at the end of the jaws 112, 114 that is closer to the securing means 106. In one embodiment, the protrusions may be moveable, so that they can be pushed in after the boot is on the dog's foot to make it easier to remove/release the dog boot from the jaws. In a preferred embodiment (not shown), the protrusions are curved (rounded) in order to make removal of the boot easier.

The PBJ 100 is designed to open its jaws 112, 114 either by squeezing the pair of handles 122, 124 together or by pulling the pair of handles 122, 124 apart. For example, according to one embodiment shown in FIGS. 2A, 2B and 3, when the pair of handles 122, 124 are squeezed together the pair of jaws 112, 114 extend away from each other. An ergonomic design may be applied to the pair of handles 122, 124 to make the squeezing of the handles 122, 124 easier for a user.

In use, a dog boot at its open end is attached around the seat 160 of the pair of jaws 112, 114, when the PBJ device 100 is in the closed position. The protrusions 302, 304 secure the dog boot to the seat 160 so that the dog boot does not slip off the jaws 112, 114. A user may then with one hand squeeze the pair of handles 122, 124 together which causes the jaws 112, 114 to expand away from each other, thereby stretching and widening the opening of the dog boot to the appropriate size and shape to allow easy insertion of the pet's foot into the pet boot. Once the pet's foot is in the pet boot, the user may move the PBJ device 100 in an upward direction to detach the pet boot from the bottom section 160 of the pair of jaws 112, 114. In the embodiment shown, there is no mechanism to hold the boot open, besides the user's hand. The jaws close by themselves using the elastic force of the boot. In other embodiments (not shown), an adjustable interference lever is used to hold the jaws open, so that the user does not have to continue to squeeze the handles together; this mechanism is then released to close the jaws.

One benefit of the PBJ is that it makes putting appropriate foot protection onto pets easier, and therefore makes it more likely that owners will use adequate foot protection from road salt and extreme cold for their pets. As previously discussed, after attaching the dog boot to the seat 160 of the pair of jaws 112, 114, one would only need a single hand to stretch the dog boot to its fullest opening size and shape, thus allowing the free hand to be used to easily insert the dog's foot into the dog boot. Once the dog's foot is securely in the dog boot, a user can pull or move the PBJ device 100 up slightly until the pair of jaws 112, 114 clear the opening of the dog boot and then can release the pair of handles 122, 124 of the PBJ device 100 to return the device 100 to its closed position.

The PBJ device 100 may be made of varying production materials such as plastic or composite materials. Other possible materials include, but are not limited to, metal, alloy, stainless steel, and wood.

The scope of the claims should not be limited by the embodiments set forth in the examples, but should be given the broadest interpretation consistent with the description as a whole.

The invention claimed is:

1. A device for securing an animal boot having an open end and a closed end to an animal's foot, the device comprising:
   a pair of handles;
   a securing means;
   a pair of jaws pivotally attached to the pair of handles at the securing means;
   wherein the pair of jaws receive the open end of the animal boot;
   wherein the pair of jaws expand the open end of the animal boot when the pair of handles are squeezed towards each other;
   wherein the size and shape of the pair of jaws in a closed configuration form a generally closed shape which corresponds to the size and shape of the open end of the animal boot;
   wherein the pair of jaws each have a top section and a bottom section, and wherein the bottom section is recessed from the top section and
   wherein the sides of the open end of the animal boot surround the sides of the bottom section.

2. The device of claim 1, wherein the sides of the open end of the animal boot surround the sides of the pair of jaws.

3. The device of claim 1, wherein the pair of jaws have one or more protrusions extending outwardly for securing the animal boot to the pair of jaws.

4. The device of claim 1, wherein the size and shape of the pair of jaws in an open configuration is larger than the size and shape of the animal's foot.

5. The device of claim 1, wherein the animal boot is made of a flexible and elastic material.

6. A method of attaching an animal boot having an open end and a closed end to an animal's foot using a device having a pair of jaws and a pair of handles pivotably attached to the pair of jaws;
   wherein the size and shape of the pair of jaws in a closed configuration form a generally closed shape which corresponds to the size and shape of the open end of the animal boot;
   wherein the pair of jaws each have a top section and a bottom section;
   wherein the bottom section is recessed from the top section; and
   wherein the sides of the open end of the animal boot surround the sides of the bottom section;
   the method comprising:
   attaching the open end of the animal boot to the pair of jaws;
   squeezing the pair of handles together to expand the open end of the animal boot; inserting the animal's foot into the open end of the animal boot; and
   moving the device in an upward direction to detach the animal boot from the pair of jaws.

7. A device for securing an animal boot having an open end and a closed end to an animal's foot, the device comprising:
   a pair of handles;
   a securing means;
   a pair of jaws pivotally attached to the pair of handles at the securing means;
   wherein the pair of jaws receive the open end of the animal boot; and wherein the pair of jaws expand the open end of the animal boot when the pair of handles are pulled away from each other;

wherein the size and shape of the pair of jaws in a closed configuration form a generally closed shape which corresponds to the size and shape of the open end of the animal boot;

wherein the pair of jaws each have a top section and a bottom section;

wherein the bottom section is recessed from the top section; and wherein the sides of the open end of the animal boot surround the sides of the bottom section.

\* \* \* \* \*